United States Patent
Mayerle et al.

(10) Patent No.: US 6,666,156 B1
(45) Date of Patent: Dec. 23, 2003

(54) SEED FLAP FOR CONTROLLING SEED PLACEMENT

(75) Inventors: Dean Mayerle, Saskatoon (CA); Vince Colistro, Saskatoon (CA); Dick Friesen, Hepburn (CA); Robin Schilling, Saskatoon (CA)

(73) Assignee: New Holland North America, Racine, WI (US)

( * ) Notice: Subject to any disclaimer, the term of this patent is extended or adjusted under 35 U.S.C. 154(b) by 0 days.

(21) Appl. No.: 10/225,422

(22) Filed: Aug. 22, 2002

(51) Int. Cl.[7] ................................................. A01C 5/00
(52) U.S. Cl. ....................................................... 111/150
(58) Field of Search ............................. 111/150, 157, 111/176, 189, 197, 198, 149, 170, 190, 148

(56) References Cited

U.S. PATENT DOCUMENTS

| | | | | |
|---|---|---|---|---|
| 183,947 A | * | 10/1876 | Lewis | 111/190 |
| 252,265 A | * | 1/1882 | Scofield | 111/197 |
| 410,438 A | * | 9/1889 | Patric et al. | 111/84 |
| 909,137 A | * | 1/1909 | Bellerive | 111/190 |
| 2,533,374 A | * | 12/1950 | Hyland | 111/150 |
| 2,554,205 A | * | 5/1951 | Oehler | 111/150 |
| 2,872,883 A | * | 2/1959 | Padrick | 111/153 |
| 3,308,775 A | * | 3/1967 | Klene | 111/153 |
| 3,336,885 A | * | 8/1967 | Lebow | 111/150 |
| 4,253,412 A | * | 3/1981 | Hogenson | 111/150 |
| 4,760,806 A | | 8/1988 | Bigbee et al. | |
| 5,092,255 A | | 3/1992 | Long et al. | |
| 5,425,318 A | * | 6/1995 | Keeton | 111/197 |
| 5,640,915 A | | 6/1997 | Schaffert | |
| 5,673,638 A | | 10/1997 | Keeton | |
| 5,918,557 A | | 7/1999 | Schaffert | |
| 6,082,275 A | | 7/2000 | Schaffert | |
| 6,173,664 B1 | | 1/2001 | Heimbuch | |
| 6,178,901 B1 | * | 1/2001 | Anderson | 111/197 |
| 6,283,050 B1 | | 9/2001 | Schaffert | |
| 6,289,829 B1 | * | 9/2001 | Fish et al. | 111/121 |
| 6,314,897 B1 | | 11/2001 | Hagny | |

FOREIGN PATENT DOCUMENTS

| | | |
|---|---|---|
| DE | 3441610 | 5/1986 |
| FR | 2573610 | 5/1986 |
| FR | 2658380 | * 8/1991 |

* cited by examiner

Primary Examiner—Victor Batson
(74) Attorney, Agent, or Firm—Rebecca Henkel

(57) ABSTRACT

A seed flap for a disc opener associates with an air seeder operable to place seed and fertilizer into a furrow formed in the ground by the disc opener. The seed flap is formed from a non-flexible material, such as an abrasion resistant steel, and pivotally mounted to the seed tube to permit the seed flap to trail behind the seed tube and control the placement of seeds and/or fertilizer discharged from the seed tube. The pivotal mounting of the seed flap will provide movement of the seed flap relative to the seed tube to permit the seed flap to more consistently align with the bottom of the furrow and better follow the furrow bottom created by the disc opener while the disc opener is moving through a turn. A spring mechanism operably coupled to the seed flap will provide a positive force for firming the placement of the seed into the soil. A retention device, such as a clip, will be operable to hold the seed flap in an elevated, inoperable position as desired by the operator.

25 Claims, 11 Drawing Sheets

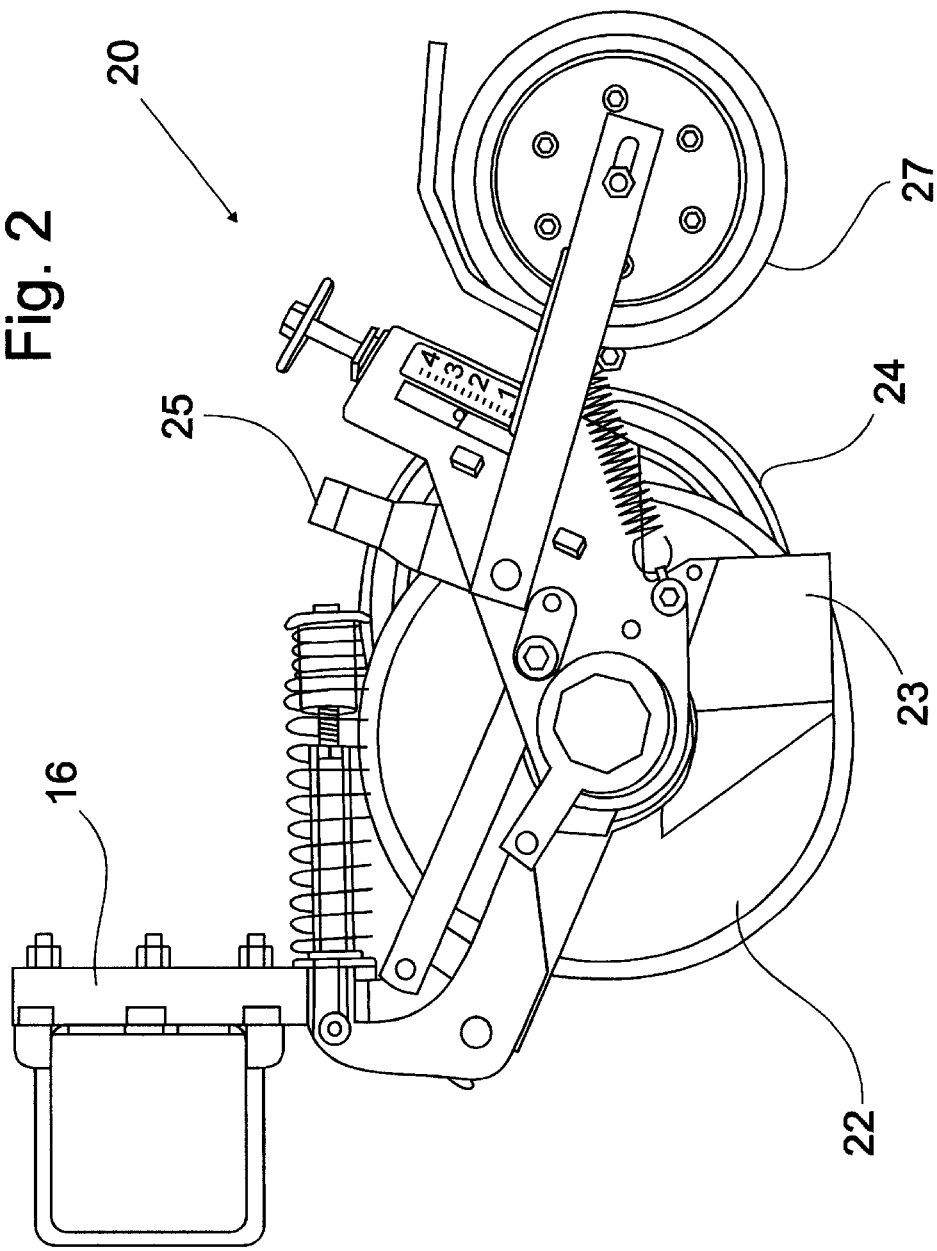

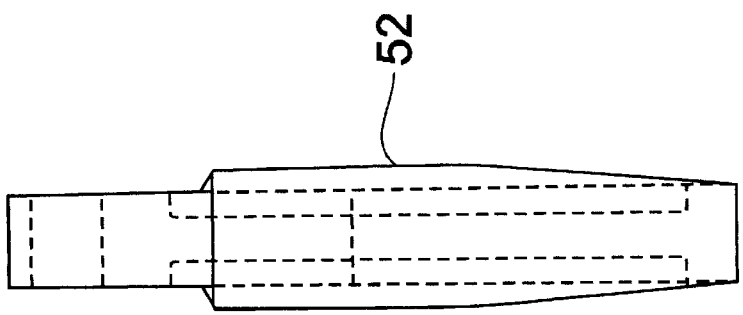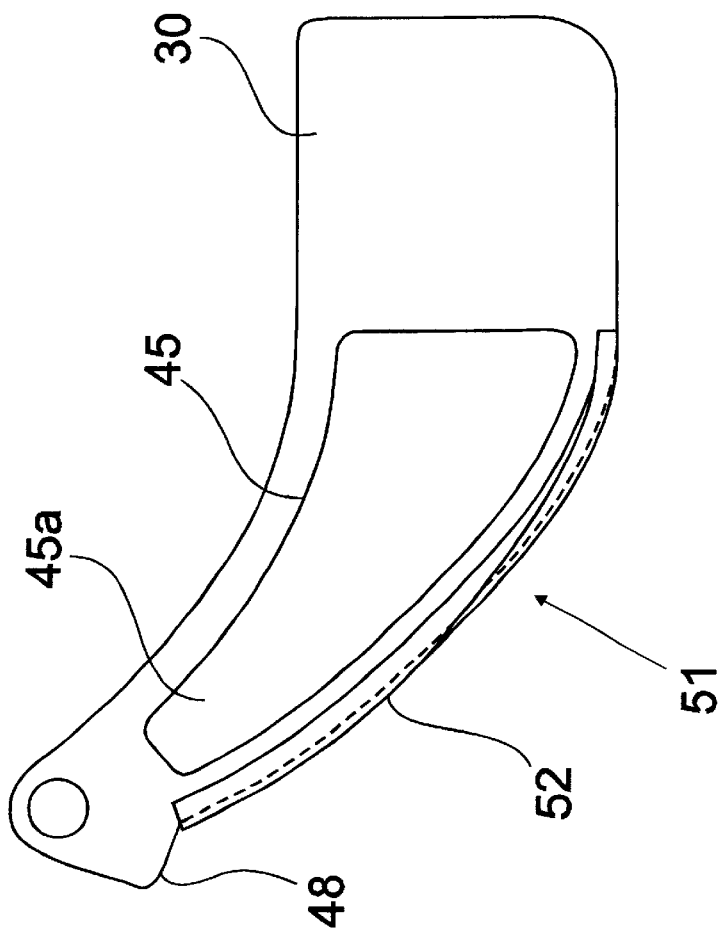

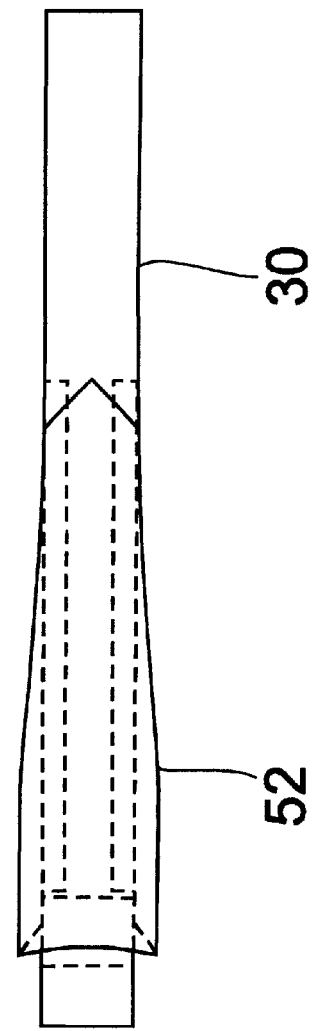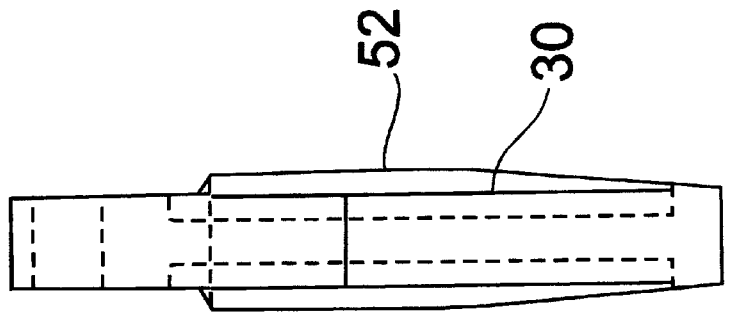

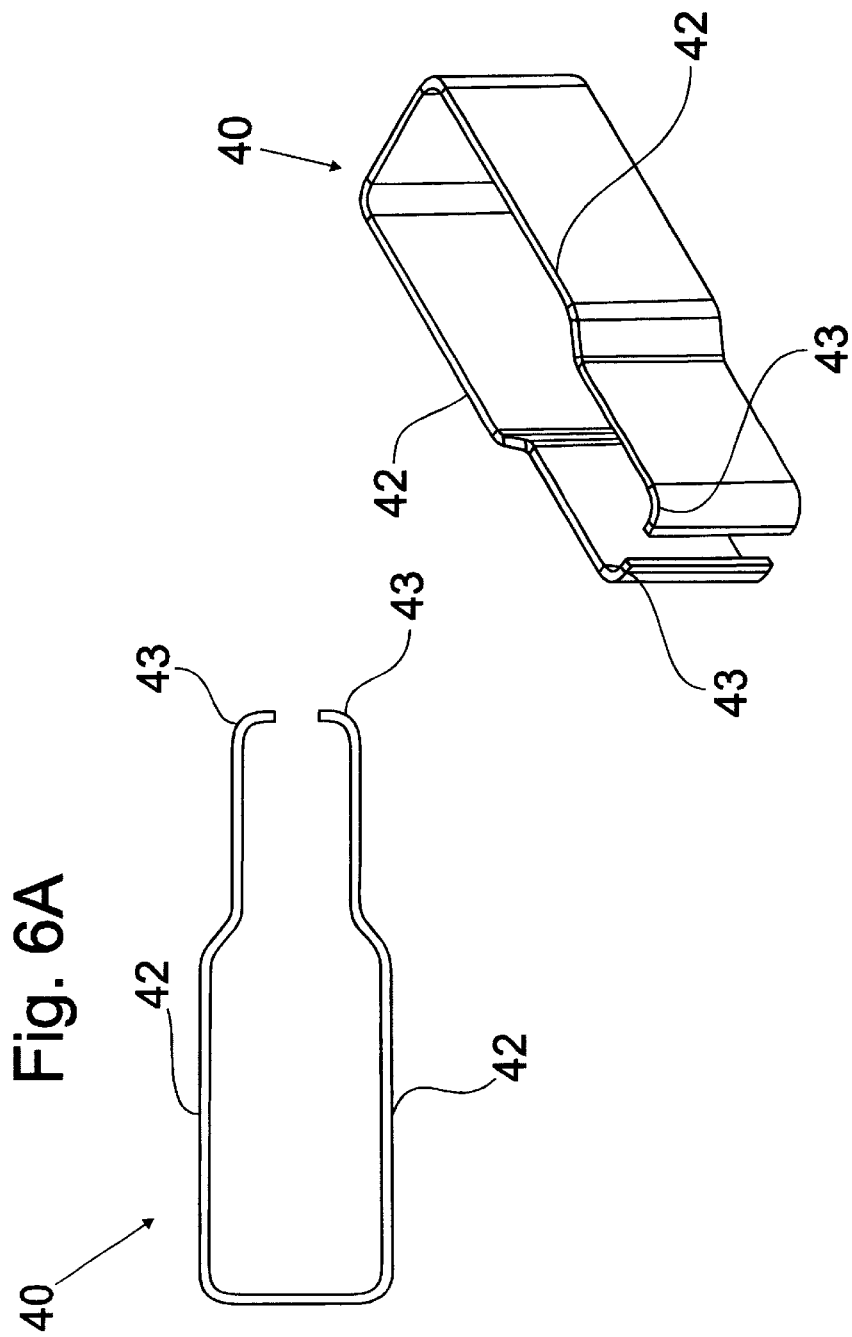

US 6,666,156 B1

SEED FLAP FOR CONTROLLING SEED PLACEMENT

FIELD OF THE INVENTION

The present invention relates generally to agricultural planters and seeders that form a furrow in the ground for the placement of seeds therein, and more particularly, to a device for controlling the placement of a seed when the seed is placed in the furrow.

BACKGROUND OF THE INVENTION

Agricultural planting machines are manufactured in different forms, one of which is a device commonly referred to as an air seeder. The air seeder carries seed, fertilizer and possibly other chemicals in a tank that opens into a pneumatic conveyance mechanism that transports the seed and perhaps fertilizer to a planting apparatus, one of which can be commonly referred to as a disc opener. The pneumatic conveyance mechanism includes a fan that creates a flow of air at such a velocity that the seeds and/or fertilizer dropped into the air stream becomes airborne and is conveyed to the disc opener. Metering mechanisms restrain the flow of seed and fertilizer into the pneumatic conveyance mechanism to control the rate of application of seed and fertilizer to the ground.

Disc openers are designed to move through the soil and place product such as seed, fertilizer, or other micro nutrients into the ground while creating as little disturbance as possible to the surrounding environment. To accomplish this goal, the disc usually opens a small trench or furrow into the ground in which the product is placed. The pneumatic conveyance mechanism conveys the product from the central tank to the small trench. Depending on the settings made for the variably operable pneumatic conveyance mechanism, this air velocity may make precise placement of the seed difficult. Seed placement is made even more difficult by the nature of the pneumatic conveyance mechanism which are often difficult to set for any particular ground condition. As a result, operators often set the air velocities at a greater rate than is optimally necessary. Such seed velocities at the disc opener can result in significant difficulties in getting the product properly placed at the bottom of the trench or furrow due to product bounce.

U.S. Pat. No. 4,760,806, granted to John Deere & Company on Aug. 2, 1988, is directed to a flexible seed flap that is positioned at the top of the trench to retrain movement of the product being conveyed into the trench by the product conveyance mechanism. This seed flap, however, is not long enough to help with the placement of seed at the bottom of the trench. As a result, such devices do not solve the problem of keeping the seed in the bottom of the trench or furrow.

U.S. Pat. No. 5,673,638, issued to J & K Keeton Enterprises, Inc. on Oct. 7, 1997, is directed to an improvement to the seed flap disclosed in U.S. Pat. No. 4,760,806. Such seed flaps are ineffective in muddy conditions and suffer from a deficit in the ability to easily and quickly remove or replace the seed flap when ground conditions change. Further, the seed flap is rigidly mounted and has a long profile, thus making the seed flap lose performance when the implement is turning. Flexi-Coil Ltd, the assignee of the instant application, commercially introduced a seed flap at the end of 1999 that provided good results in both wet and dry soil conditions, but restricted air flow associated with large application rates of fertilizer.

Accordingly, it would be desirable to provide a seed flap that can be effective in both wet (e.g., muddy conditions) and dry soil conditions and provide convenient accessibility for moving the seed flap when the seed flap is not required without restricting air flow rates, particularly the air flow rates associated with large fertilizer application rates.

SUMMARY OF THE INVENTION

Accordingly, an important object of the present invention is to provide a seed flap device to enhance seed and fertilizer placement for air seeder disc openers.

It is another object of this invention to provide a non-flexible seed flap that will ride at the bottom of the trench or furrow formed by the disc opener to prevent product bounce from high velocity seeds exiting the seed tube.

It is a further object of this invention to provide a seed flap that can be easily moved from a lowered operative position to a raised inoperative position.

It is a feature of this invention to provide an apparatus that establishes a positive force to seat the seed delivered into the bottom of the furrow created by the disc opener.

It is an advantage of this invention that the seed can be firmly placed into the furrow created by the disc opener.

It is another advantage of this invention that seed firming can be accomplished with a less costly device than a firming wheel which is commonly used with air seeder disc openers.

It is another feature of this invention that the non-flexible seed flap can be coupled to a spring or a torsion device to create a positive pressure for seed firming in the trench or furrow.

It is another feature of this invention that a double pivot mechanism is provided for a non-flexible seed flap.

It is still another advantage of this invention that the seed flap could be mounted to the disc opener by a multi-axis pivot apparatus to simplify the mounting of the seed flap.

It is still another feature of this invention that the pivotally mounted seed flap provides enhanced following of the furrow bottom while the disc toolbar is turning in the field.

It is a yet another advantage of this invention that the pivotally mounted seed flap is adaptable to a dual-axis disc opener.

It is another feature of this invention that a transport stop is provided so that the seed flap will not drag during transport.

It is yet another feature of this invention that a clip can be provided to hold the seed flap in a raised inoperative position which can be desirable in certain ground conditions where the use of the seed flap is undesirable.

It is yet another feature of this invention that the seed flap can be coated with friction lowering compounds.

These and other objects, features, and advantages are accomplished according to the present invention by providing a seed flap for a disc opener associated with an air seeder operable to place seed and fertilizer into a furrow formed in the ground by the disc opener. The seed flap is formed from a non-flexible material, such as an abrasion resistant steel, and pivotally mounted to the seed tube to permit the seed flap to trail behind the seed tube and control the placement of seeds and/or fertilizer discharged from the seed tube. The pivotal mounting of the seed flap will provide movement of the seed flap relative to the seed tube to permit the seed flap to better follow the bottom of the furrow created by the disc opener. This simplifies furrow alignment problems and helps the seed flap follow the furrow while the disc opener is moving through a turn. In an alternative embodiment, a spring mechanism operably coupled to the seed flap will provide a positive force for firming the placement of the seed into the soil. A retention device, such as a clip, will be operable to hold the seed flap in an elevated, inoperable position as desired by the operator.

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a side elevational view of a disc opener mechanism forming a part of the air seeder mechanism depicted in FIG. 1;

FIG. 5A is a side elevational view of the seed flap having a wear resistant insert attached thereto;

FIG. 5B is an end elevational view of the seed flap shown in FIG. 5A;

FIG. 5C is an end elevational view of the seed flap opposite to the view of FIG. 5B;

FIG. 5D is a bottom view of the seed flap shown in FIG. 5A;

FIG. 6A is a top view of the seed flap clip;

FIG. 6B is a perspective view of the seed flap clip depicted in FIG. 6A;

DETAILED DESCRIPTION OF THE PREFERRED EMBODIMENTS

Figure 1:
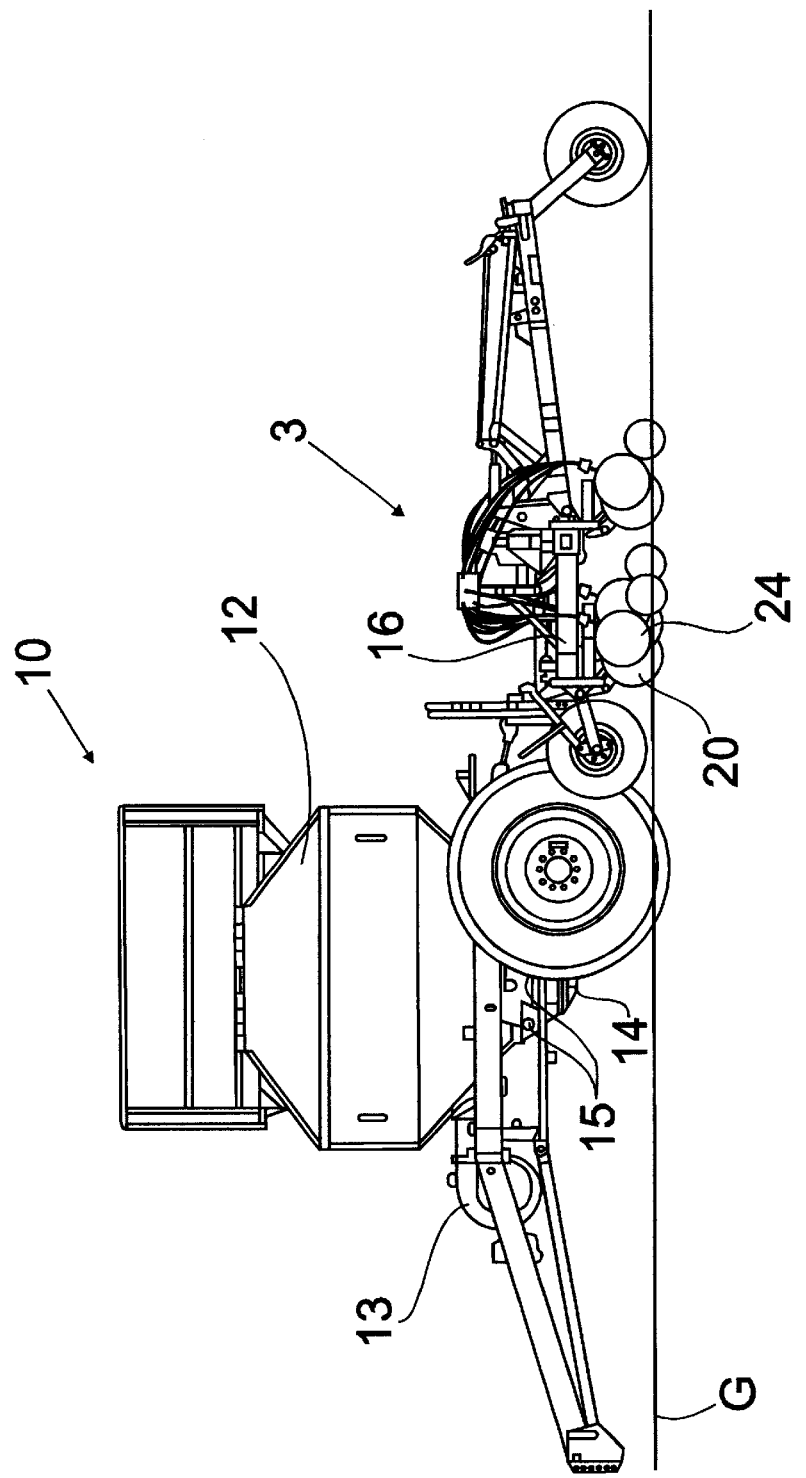
FIG. 1 is a side elevational view of an air seeder incorporating the principles of the instant invention.
Figure 3A:
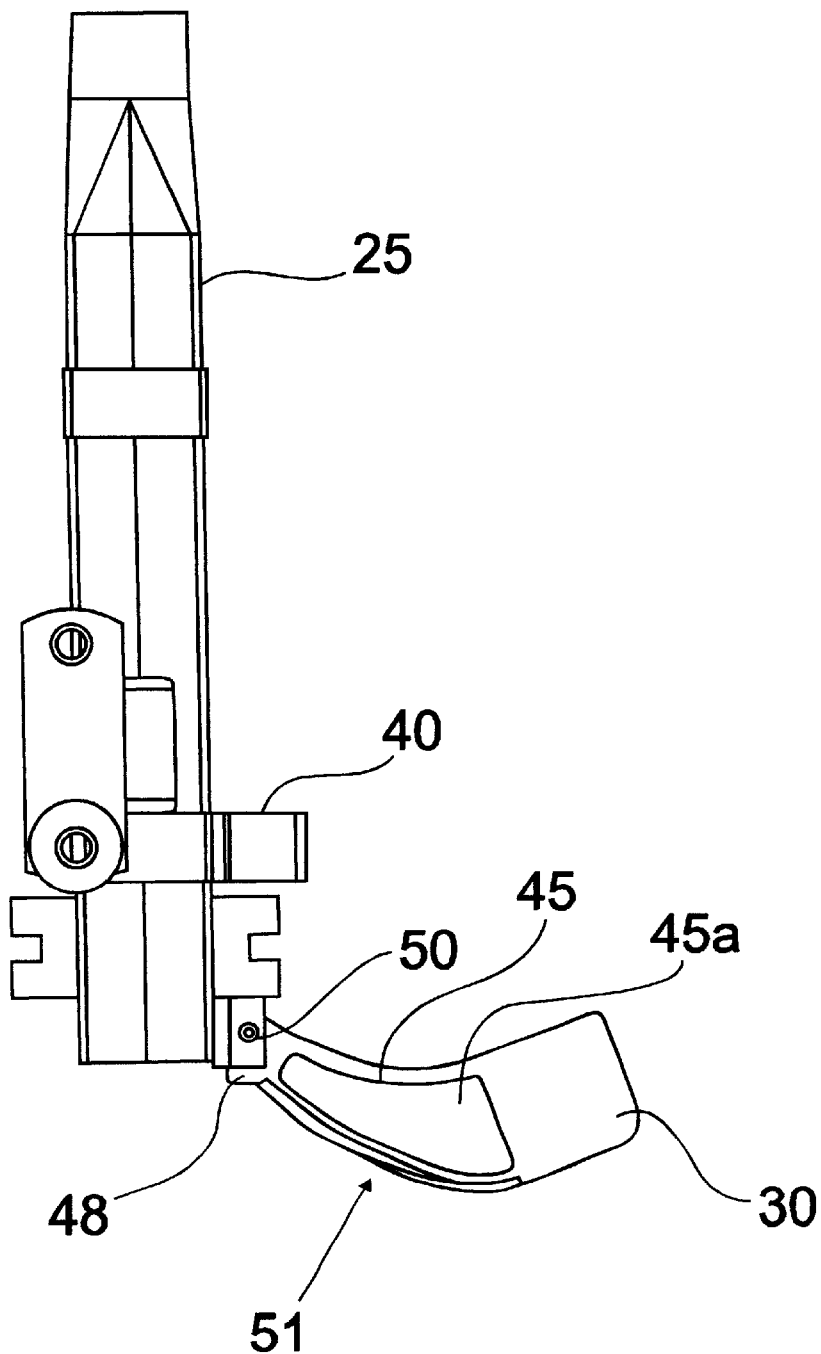
FIG. 3A is a side elevational view of a seed tube having mounted thereon a seed flap incorporating the principles of the present invention, the seed flap being positioned in the lowered, operative position.
Figure 3C:
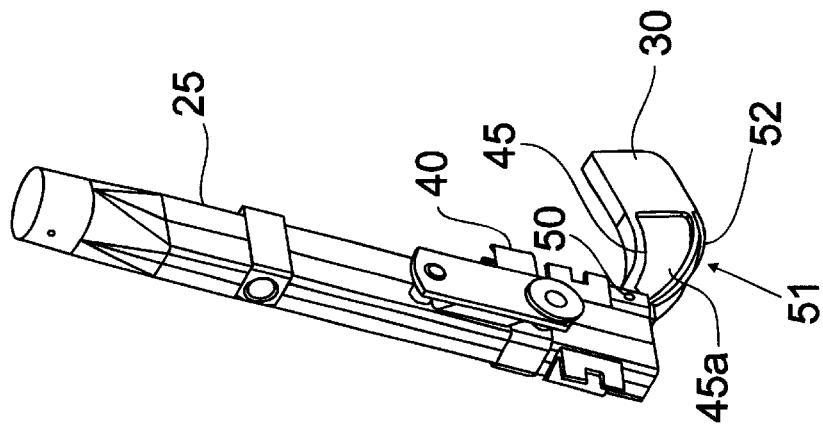
FIG. 3C is a perspective view of the seed tube depicted in FIGS. 3A and 3B.
Figure 3B:
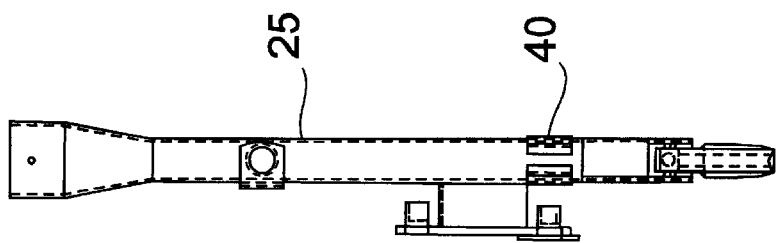
FIG. 3B is an end elevational view of the seed tube shown in FIG. 3A.

Referring to FIG. 1, an air seeder incorporating the principles of the present invention can best be seen. Any left and right references are used as a matter of convenience and are determined by standing at the rear of the vehicle and facing forwardly into the direction of travel toward the tractor to which the air seeder is customarily attached for motive and operative power.

The air seeder 10 is customarily attached to a tractor (not shown) in a conventional manner to provide power for both mobile movement of the air seeder over the ground G and operative power for powering the operation of the air seeder 10, as will be described in greater detail below. The air seeder 10 is provided with a central tank 12, which can be multi-compartmental to provide storage capacity for seed, fertilizer and other products to be applied to the ground for the planting process. A fan mechanism 13 provides a source of high velocity air to be forced through tubing 14 coupled to the tank 12 to receive a supply of product therefrom for dispensing to the ground in a conventional manner. A metering mechanism 15 controls the flow of product into the pneumatic tubing 14 to control the rate of flow of product to the ground G.

As best seen in FIGS. 1–2, the air seeder 10 also includes a plurality of transversely spaced, and possible longitudinally spaced, disc opener assemblies 20 to create a trench or furrow into the surface of the ground G to provide a seed bed for the placement of seed and fertilizer, etc. being dispensed from the central tank 12. The disc opener assembly 20 is suspended from a frame component 16 of the air seeder to preferably trail behind the tank 12 and includes a coulter disc 22 that forms a small trench into the surface of the ground G. A scraper 23 helps to keep the coulter disc 22 clean of soil as the coulter disc 22 passes through the ground G and prevents loose soil from falling into the furrow while the seed is being placed into the furrow. An adjustable gauge wheel 24 determines the depth to which the coulter disc 22 cuts into the ground G as the gauge wheel 24 rides on top of the ground surface. A press wheel 27 trails the coulter disc 22 to close the trench formed in the ground after the placement of the seed, fertilizer and/or other product into the trench.

A seed tube 25 is supported on the disc opener to drop seed and other product into the trench formed by the coulter disc 22. The seed tube 25 is positioned adjacent the coulter disc 22 to drop seed and other product into the trench as the coulter disc 22 withdraws from the ground G. Some configurations of disc opener assemblies 20 will have multiple product delivery tubes 25 to place different product in different portions of the trench.

Referring to FIGS. 3A–6B, the seed flap assembly incorporating the principles of the present invention can best be seen. In its simplest embodiment, the seed flap 30 is affixed at its forwardmost end to the seed tube 25 via a pivot pin 50, or other similar structure which would provide pivotal movement of the seed flap 30 relative to the seed tube 25. In a preferred embodiment, the seed flap 30 is capable of side-to-side movement in addition to the vertical pivotal movement provided by the pivot pin 50. Such movement can be accomplished by placing the pivot pin 50 into an oversized hole formed in the seed flap 30 for the passage of the pivot pin 50, thus allowing limited universal movement of the seed flap 30 relative to the ground G. The pivotal mounting of the seed flap 30 provides movement of the seed flap 30 relative to the seed tube 25 to permit the seed flap 30 to accurately follow the trench formed by the coulter disc 22 and control the placement of the seeds and/or fertilizer discharged from the seed tube 25. Moreover, the seed flap 30 can be easily and quickly replaced by removing the pin 50. A torsion spring (not shown) can be utilized at the pivot pin 50 to provide a positive force on the seed flap 30 for firming the placement of the seed into the soil.

The seed flap 30 is formed of a longitudinally extending body member, preferably shaped in a wedge at the terminus of the seed flap 30. The bottom leading edge 51 is generally a downward facing concave, the shape of which permits the seed flap 30 to glide through the furrow and assists in accurately placing the seeds into the bottom of the furrow. A transport stop 48 is provided at the forward end of the seed flap 30 to limit the rotation of the seed flap 30 and thereby prevent the seed flap 30 from contacting the ground when the disc opener is raised out of the ground. The seed flap 30 is formed from a non-flexible material, such as an abrasion resistant steel. In a preferred embodiment, the seed flap is coated with a non-flexible, friction lowering compound 52 to reduce friction and enhance the life of the seed flap 30. The compound 52 could be applied to the seed flap 30 as a removable insert which could be replaced when worn sufficiently to increase the operative life of the seed flap 30. One of ordinary skill in the art would readily identify such friction reducing compounds for use in the instant invention.

Figure 4A:
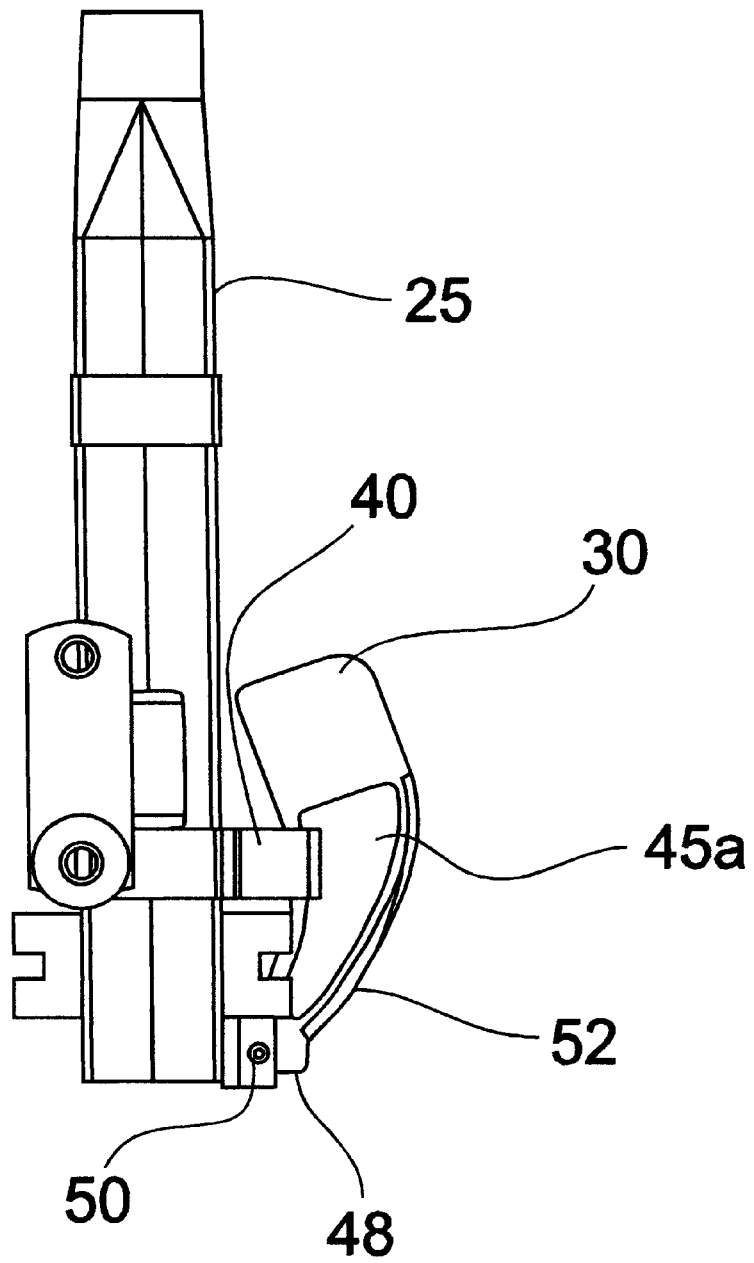
FIG. 4A is a side elevational view of the seed tube similar to FIG. 3A but with the seed flap in the raised, inoperative position.
Figure 4C:
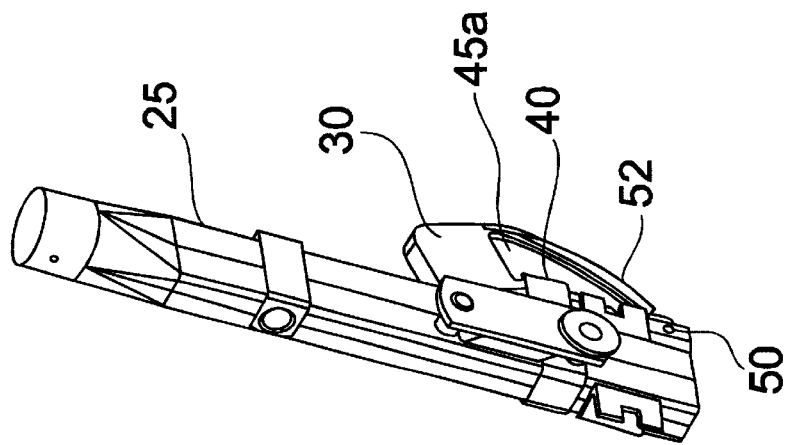
FIG. 4C is a perspective view of the seed tube depicted in FIGS. 4A and 4B.
Figure 4B:
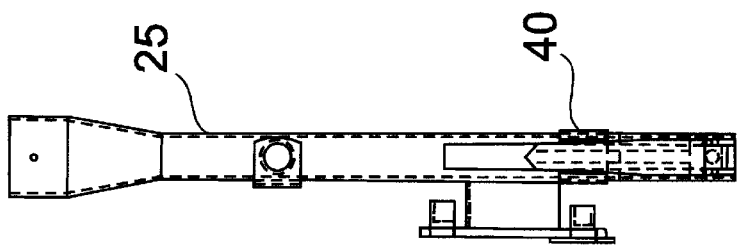
FIG. 4B is an end elevational view of the seed tube shown in FIG. 4A.

A retaining clip 40 is fit over the seed tube 25 in a position to engage the seed flap 30 and restrain the seed flap 30 in an elevated, inoperative position. For example, the retaining clip 40 can be fixed to the clip mounting member 39 of the second piece 35 of the mounting bracket 32. The retaining clip 40 can have a variety of configurations. The preferred embodiment, as shown in FIG. 6B, is of an open clip member defined by two parallel legs 42 that terminate in inwardly directed flanges 43. The flanges 43 can engage a recessed portion 45a defining a T-shaped configuration of the top portion 45 of the seed flap 30 by either having the legs 42 diverge with pressure upon engagement of the T-shaped portion 45 or by having the retaining clip 40 pivotally swing into and out of engagement with the T-shaped top portion 45 of the seed flap 30. The purpose of the retaining clip 40 is to hold the seed flap 30 in a nonoperative position, as shown in FIGS. 4A–4C and in phantom in FIG. 7, when desired by the operator due to ground conditions not being conducive to the use of the seed flap 30.

Alternatively, the retaining clip 40 could be formed as a spring-loaded hinge, somewhat like a clothes pin (not shown). The spring (not shown) would urge the legs 42 into engagement with the seed flap 30. Once engaged, the release of the seed flap 30 would be accomplished by squeezing the top portions of the legs 42 towards each other to spread the bottom portions of the legs 42 away from the seed flap 30, thereby causing the seed flap 30 to fall into the working position. Engagement between the seed flap 30 and the alternative retaining clip (not shown) can be accomplished simply by pushing the seed flap 30 upwardly between the legs 42 until the flanges 43 engage the relief in the top portion 45 of the seed flap 30.

Figure 7:
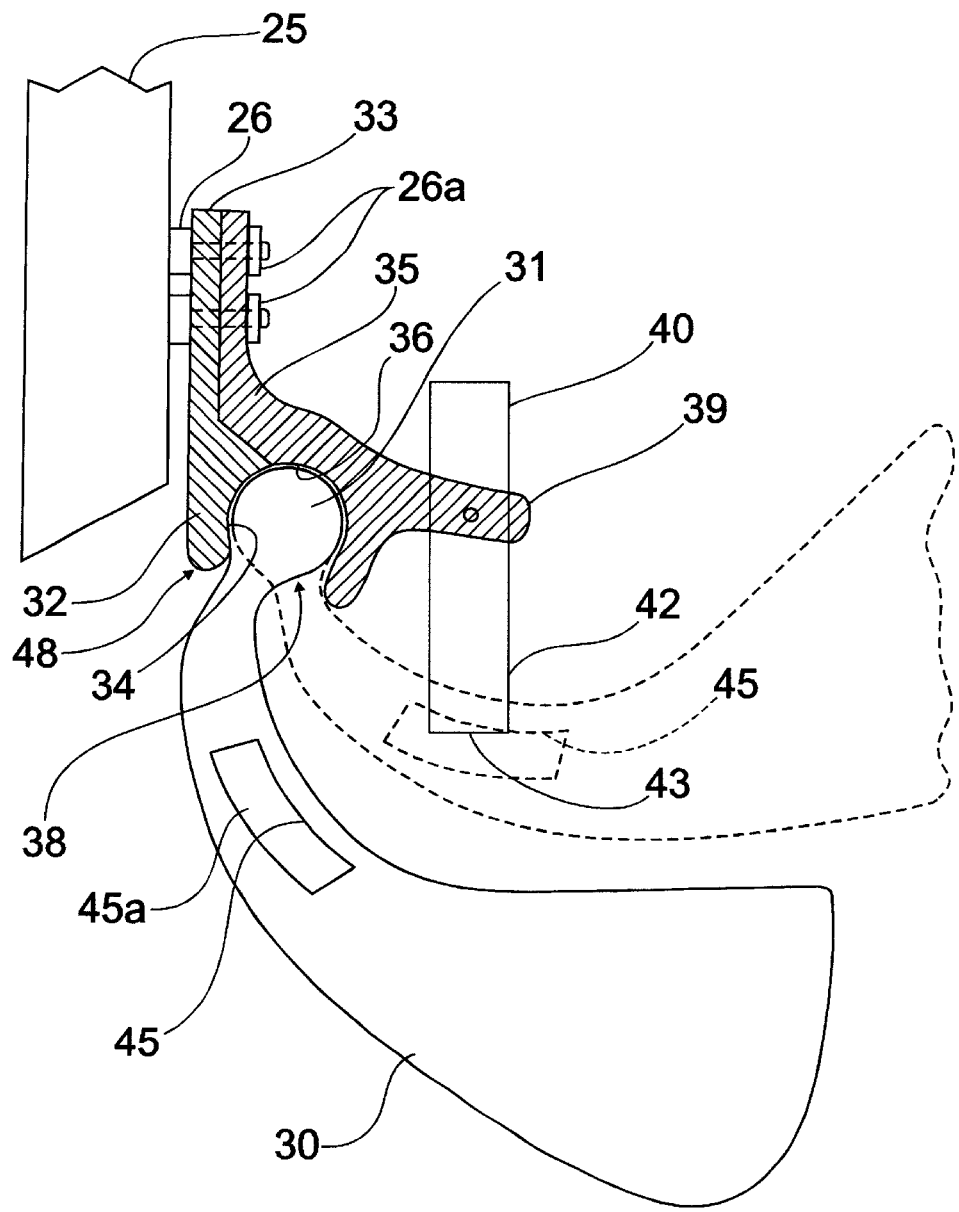
FIG. 7 is an enlarged side elevational view of an alternative embodiment of the seed flap mounted to the end of the seed tube of the disc opener, the raised, inoperative position of the seed flap being shown in phantom.
Figure 8:
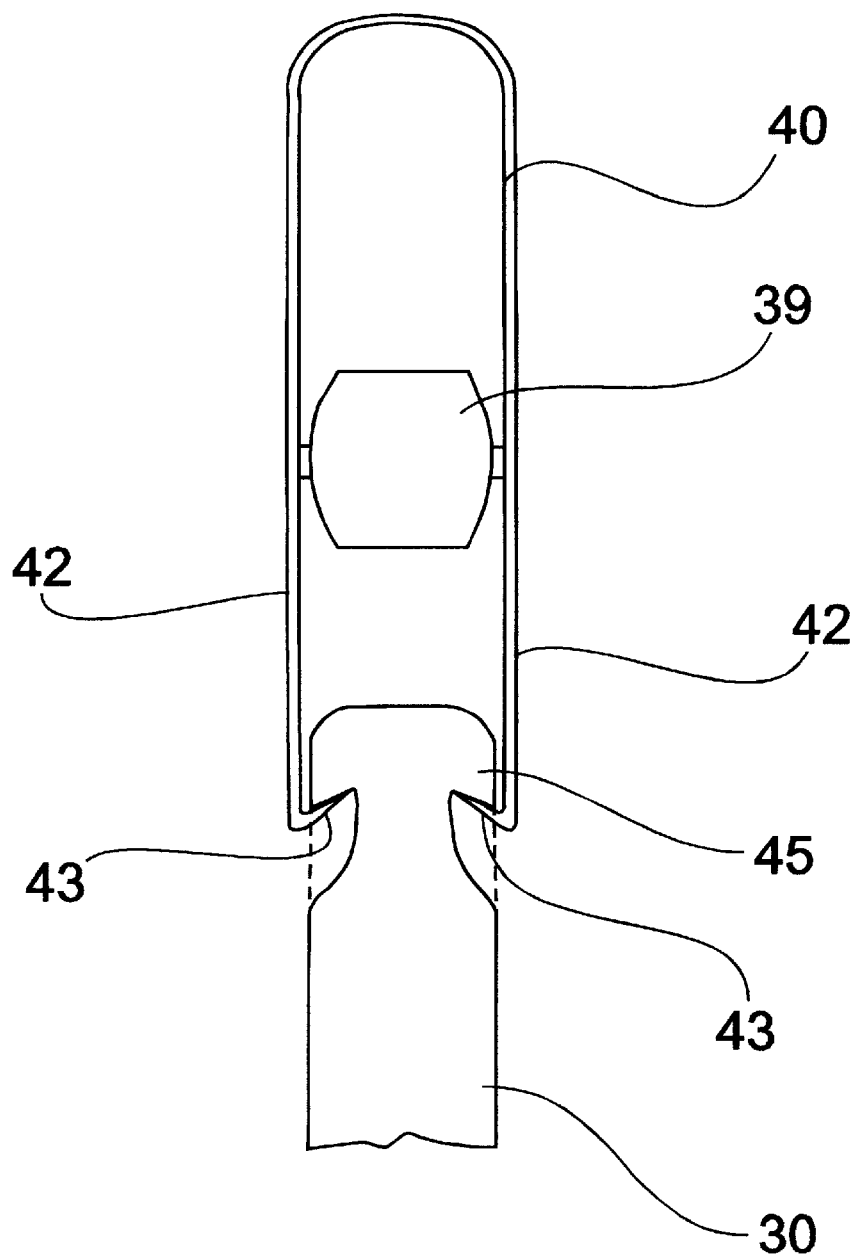
FIG. 8 is a partial top plan view of the clip device shown in FIG. 7 for holding the seed flap in the raised, operative position.

Referring now to FIGS. 7–8, an alternative configuration of the seed flap assembly 30 can best be seen. The back of the seed tube 25 is provided with a mounting structure 26, preferably a pair of threaded nuts 26a welded to the back of the seed tube 25. A mounting bracket 32 is fastened to the mounting structure 26 to support the seed flap 30 from the seed tube 25. The mounting bracket 32 is preferably of a two piece configuration with a first piece 33 forming a base member defining a concave portion 34 at the lower extremity thereof. The second piece 35 of the mounting bracket 32 is fastened on top of the first piece 32 and also defines a concave portion 36 that mates with the concave portion 34 of the first piece 33 to form a semi-spherical keeper 38. As described above, a transport stop 48 prevents the seed flap from contacting the ground when the disc opener is raised from the ground. A clip mounting member 39 extends rearwardly of the semi-spherical keeper 38 to provide a support for a retaining clip 40 described in greater detail below.

The seed flap 30 is formed with a spherical ball 31 or a pin and loose joint (not shown) that is retained within the semi-spherical keeper 38 to provide a multi-axis pivotal mounting of the seed flap 30 to the seed tube 25. One skilled in the art will readily recognize that a dual axis pivotal connection would provide adequate ranges of movement for the seed flap, with one axis being generally fore-and-aft to allow the seed flap 30 to swing from side to side and the other axis being generally transverse to permit the seed flap 30 to move in a generally vertical direction. The spherical ball 31 provides a more universal movement of the seed flap 30 to allow the seed flap 30 to more accurately follow the trench formed by the coulter disc 22, particularly when the disc opener assembly 20 is going around a turn.

Forming the mounting bracket 32 by two detachable pieces 32, 35 that together defines the semi-spherical keeper 38 retaining the spherical ball 31 for universal, movement with respect to the mounting bracket 32, allows an easy replacement of the seed flap 30 simply by releasing the fasteners connecting the mounting bracket 32 to the seed tube 25 to allow the second piece 35 of the mounting bracket 32 to separate from the first piece 33. The separation of the semi-spherical keeper 38 formed by the two concave portions 34, 36 of the respective halves 33, 35 of the mounting bracket 32 allows the seed flap 30 to be easily and quickly removed from the mounting bracket 32 and easily replaced by another seed flap 30.

The shape of the seed flap 30 is preferably a downward facing concave on the bottom leading edge of the seed flap 30 to channel and seat the seeds into the bottom of the furrow. A spring mechanism (e.g., a torsion spring) can be mounted to the second piece 35 of the mounting bracket 32 to engage the seed flap 30 to urge the seed flap 30 into a downward position engaging the bottom of the furrow. By causing a positive force that will seat the seed into the bottom of the furrow, the seed flap 30 can replace a conventional firming wheel (not shown) that is typically associated with disc opener assemblies 20.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

What is claimed is:

1. In an agricultural planting apparatus having a device for forming a furrow into the ground; a seed delivery apparatus to dispense seed into the furrow after the furrow has been formed; and a furrow closing device to close the furrow after the seed has been deposited therein, the improvement comprising:

a rigid seed flap member pivotally attached to said seed delivery apparatus by a pivot mechanism providing generally vertical movement for said seed flap to permit said seed flap to follow ground undulations, said seed flap being positioned for engagement with the furrow to position said seed in the bottom of said furrow, wherein said seed delivery apparatus includes a seed tube positioned adjacent to said device for forming a furrow, said seed flap being mounted to said seed tube to closely follow the movement of said seed tube; and a mounting bracket, said mounting bracket including a retaining clip positioned to engage said seed flap to restrain said seed flap in a raised inoperative position.

2. The agricultural planting apparatus of claim 1, wherein said mounting bracket is detachably connected to said seed tube, said mounting bracket being formed in a manner that will allow disconnection and an associated release of said seed flap member.

3. The agricultural planting apparatus of claim 2, wherein said seed flap member further includes a spherical ball, and wherein said mounting bracket is formed in a manner that will allow disconnection and an associated release of said spherical ball of said seed flap.

4. The agricultural planting apparatus of claim 3, where said seed flap is formed with a recession defining a T-shaped top that is engageable with said retaining clip.

5. The agricultural planting apparatus of claim 4, wherein said retaining clip is formed with a pair of legs terminating in inwardly directed flanges to engage said T-shaped top portion of said seed flap.

6. The agricultural planting apparatus of claim 5, wherein said seed flap is further formed with a downwardly facing concave surface on a leading edge of said seed flap.

7. A seed flap assembly for an agricultural planter for positioning within a furrow created by said agricultural planter to restrain seed placed into said furrow through a seed tube, comprising:
 a rigid seed flap member including a longitudinal extending body member pivotally attached to said seed tube by a pivot mechanism providing a single axis of movement between a lowered operative position in which said seed flap is engaged in said furrow, and a raised inoperative position; and
 a retaining clip engageable with said seed flap member to restrain said seed flap member in said raised inoperative position.

8. The seed flap assembly of claim 7, further comprising a mounting bracket detachably connected to said seed tube to support said seed flap member, said mounting bracket being formed in a manner that will allow disconnection and an associated release of said seed flap member.

9. The seed flap assembly of claim 7, wherein said pivot mechanism includes a generally horizontally disposed pivot pin supported by said seed tube, said seed tube including a hole for the passage of said pivot pin, said hole having a diameter significantly larger than said pivot pin to permit said seed flap to move from side to side relative to said seed tube.

10. The seed flap assembly of claim 9, wherein said seed flap is formed with a T-shaped top that is engageable with said retaining clip, said retaining clip being formed with a pair of legs terminating in inwardly directed flanges to engage said T-shaped top portion of said seed flap.

11. The seed flap assembly of claim 9, wherein said seed flap is further formed with a downwardly facing concave surface on a leading edge of said seed flap.

12. An agricultural air seeder planting apparatus for planting seeds and other agricultural products into the ground comprising:
 a tank for carrying seed;
 a fan mechanism for creating a flow of air through a tube delivery system cooperable with said tank to receive a supply of seeds therefrom in a metered manner from said tank;
 a disc opener assembly for creating a furrow in the ground and receiving a flow of seeds from said tube delivery system, including:
  a coulter disc for forming a furrow in the ground;
  a seed tube forming a terminus of said tube delivery system, said seed tube being positioned adjacent to said coulter disc to place said seed within said furrow as said coulter disc is creating said furrow;
  a furrow closing device to close the furrow after the seed has been deposited therein;
 a rigid seed flap member pivotally attached to the seed delivery tube by a pivot mechanism providing at least two axes of movement for said seed flap, said seed flap being positioned for engagement with the furrow to position said seed in the bottom of said furrow, wherein said seed flap member includes a longitudinal extending body member and a spherical ball positioned at a forward end of said seed flap member; and
 a mounting bracket detachably connected to said seed tube to support said seed flap member, said mounting bracket defining a semi-spherical keeper engageable with said spherical ball to provide a universal pivot connection between said seed flap and said mounting bracket.

13. The agricultural air seeder planting apparatus of claim 12, further comprising:
 a retaining clip supported on said mounting bracket and selectively engageable with said seed flap member to restrain said seed flap member in a raised inoperative position.

14. The agricultural air seeder planting apparatus of claim 13, wherein said seed flap is formed with a T-shaped top that is engageable with said retaining clip, said retaining clip being formed with a pair of legs terminating in inwardly directed flanges to engage said T-shaped top portion of said seed flap.

15. The agricultural air seeder planting apparatus of claim 14, wherein said seed flap is further formed with a downwardly facing concave surface on a leading edge of said seed flap.

16. An agricultural air seeder planting apparatus for planting seeds and other agricultural products into the ground comprising:
 a tank for carrying seed;
 a fan mechanism for creating a flow of air through a tube delivery system cooperable with said tank to receive a supply of seeds therefrom in a metered manner from said tank;
 a disc opener assembly for creating a furrow in the ground and receiving a flow of seeds from said tube delivery system, including:
  a coulter disc for forming a furrow in the ground;
  a seed tube forming a terminus of said tube delivery system, said seed tube being positioned adjacent to said coulter disc to place said seed within said furrow as said coulter disc is creating said furrow;
  a furrow closing device to close the furrow after the seed has been deposited therein; and
 a unitary rigid seed flap member pivotally attached to the seed delivery tube by a pivot mechanism providing at least two axes of movement for said seed flap, said seed flap being positioned for engagement with the furrow to position said seed in the bottom of said furrow.

17. The agricultural air seeder planting apparatus of claim 16, further including a mounting bracket detachably connected to said seed tube to support said seed flap member, said seed flap member including a longitudinal extending body member, said pivot mechanism positioned at a forward end of said seed flap member, said mounting bracket defining a keeper engageable with said pivot mechanism to provide a universal pivot connection between said seed flap member and said mounting bracket.

18. The agricultural air seeder planting apparatus of claim 17, further comprising:

a retaining clip supported on said mounting bracket and selectively engageable with said seed flap member to restrain said seed flap member in a raised inoperative position.

19. The agricultural air seeder planting apparatus of claim 18, wherein said seed flap is formed with a T-shaped top that is engageable with said retaining clip, said retaining clip being formed with a pair of legs terminating in inwardly directed flanges to engage said T-shaped top portion of said seed flap.

20. The agricultural air seeder planting apparatus of claim 19, wherein said seed flap is further formed with a downwardly facing concave surface on a leading edge of said seed flap.

21. An agricultural air seeder planting apparatus for planting seeds and other agricultural products into the ground comprising:

a tank for carrying seed;

a fan mechanism for creating a flow of air through a tube delivery system cooperable with said tank to receive a supply of seeds therefrom in a metered manner from said tank;

a disc opener assembly for creating a furrow in the ground and receiving a flow of seeds from said tube delivery system, including:

a coulter disc for forming a furrow in the ground;

a seed tube forming a terminus of said tube delivery system, said seed tube being positioned adjacent to said coulter disc to place said seed within said furrow as said coulter disc is creating said furrow;

a furrow closing device to close the furrow after the seed has been deposited therein; and a rigid seed flap member, said rigid seed flap member including a longitudinally extending body member and a pivot mechanism, said pivot mechanism defining a single pivot point and positioned at a forward end of said seed flap member, said seed flap member pivotally attached to the seed delivery tube by said pivot mechanism at said single pivot point, said single pivot point of said pivot mechanism providing at least two axes of movement for said seed flap, said seed flap being positioned for engagement with the furrow to position said seed in the bottom of said furrow.

22. The agricultural air seeder planting apparatus of claim 21, further including a mounting bracket detachably connected to said seed tube to support said seed flap member, said mounting bracket defining a keeper engageable with said pivot mechanism to provide a universal pivot connection between said seed flap member and said mounting bracket.

23. The agricultural air seeder planting apparatus of claim 22, further comprising:

a retaining clip supported on said mounting bracket and selectively engageable with said seed flap member to restrain said seed flap member in a raised inoperative position.

24. The agricultural air seeder planting apparatus of claim 23, wherein said seed flap is formed with a T-shaped top that is engageable with said retaining clip, said retaining clip being formed with a pair of legs terminating in inwardly directed flanges to engage said T-shaped top portion of said seed flap.

25. The agricultural air seeder planting apparatus of claim 26, wherein said seed flap is further formed with a downwardly facing concave surface on a leading edge of said seed flap.

* * * * *